ILLUMINATED TELEPHONE BOOTH

Original Filed March 31, 1954

3 Sheets-Sheet 1

INVENTOR.
PERCIVAL H. SHERRON
BY Bauer, Smith & Nording
ATTORNEYS

Jan. 23, 1962 P. H. SHERRON 3,017,712

ILLUMINATED TELEPHONE BOOTH

Original Filed March 31, 1954 3 Sheets-Sheet 2

INVENTOR.
PERCIVAL H. SHERRON
BY [signature]
ATTORNEYS

Jan. 23, 1962 P. H. SHERRON 3,017,712

ILLUMINATED TELEPHONE BOOTH

Original Filed March 31, 1954 3 Sheets-Sheet 3

INVENTOR.
PERCIVAL H. SHERRON
BY
Roman, Smith & Harding
ATTORNEYS 3,017,712
ILLUMINATED TELEPHONE BOOTH

Percival H. Sherron, Jamaica, N.Y. (% Sherron Metallic Corp., 1201 Flushing Ave., Brooklyn, N.Y.)

Continuation of application Ser. No. 419,963, Mar. 31, 1954. This application Oct. 6, 1958, Ser. No. 765,676
5 Claims. (Cl. 40—130)

This invention relates to an illuminated public telephone booth and, more particularly, to a public outdoor telephone booth having an illuminated member extending upwardly above the sides of the booth and having illuminated indicia bearing panels extending transversely of the upper portions of the sides of the booth.

This application is a continuation of my copending application Serial No. 419,963, filed March 31, 1954, now abandoned.

The use of public outdoor telephone booths has increased greatly in recent years coincident with the increase in highway and long distance commuter travel. Public outdoor telephones are installed at intervals along the new super highways, at railway commuter stations, in highway gasoline stations and in numerous other locations where a public outdoor telephone booth may be of service. It is desirable to position the booths where they are completely visible and accessible to the public at all times. Installations of this type avoid the inconvenience formerly attending the use of public telephones which were, for example, usually installed within an attendant's working or showroom space in a gasoline station or in an otherwise occupied enclosure.

It will, of course, be evident that telephone service is as important at night time as it is in the day time. An outdoor telephone booth which is available for twenty-four hours a day is desirably provided with illuminating means in order that the presence of the booth may be observed at night time by a person desiring to make a telephone call.

It is an object of this invention to provide an illuminated telephone booth which will be clearly visible at night from a considerable distance.

It is a further object of the invention to provide a telephone booth having illuminated means extending above the side panels of the booth indicative of the fact that the booth is a telephone booth.

It is a further object of the invention to provide a telephone booth having illuminated panels suitable for bearing the word "Telephone" in an illuminated manner and being of such size that the word is clearly legible from a considerable distance.

It is a further object of the invention to provide means whereby a conventional telephone booth may be provided with external illumination and illuminated indicia indicating the booth to be a telephone booth.

These and other objects of the invention will become apparent from the following description when read in conjunction with the accompanying drawings, in which.

Figure 4:
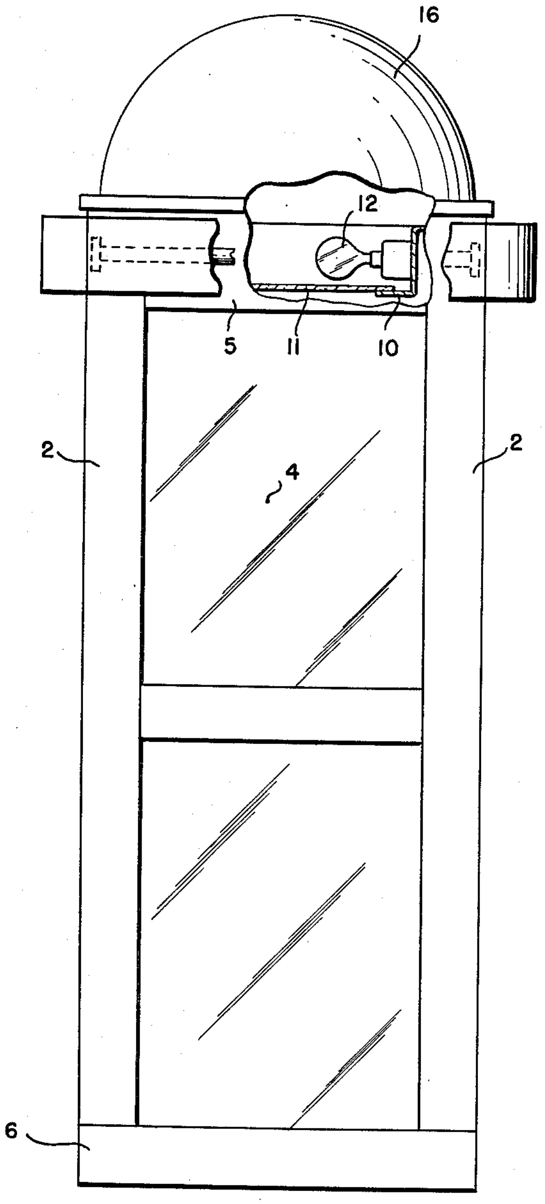
FIGURE 4 is a partially cut-away elevation of a telephone booth showing the interior illuminating means for the top portion of the booth and showing a top portion of alternative form from that shown in FIGURE 1.

The basic telephone booth structure involved herein is entirely conventional and includes four corner posts 2 between which there are supported on three sides side panel assemblies 4 and on the fourth side a door assembly not shown in the drawings. A lintel structure 5 is supported between the posts at the upper ends thereof on each side of the booth. Referring particularly to FIGURE 4, the corner posts 2 rest upon a base structure 6. Supported within the telephone booth at the upper portion thereof is a ceiling pan 10 having an opening in the bottom thereof covered with a translucent panel 11. An illuminating lamp 12 is mounted within the pan 10. Details of this structure are more fully set forth in my copending patent applications Serial No. 307,630, filed September 3, 1952 and Serial No. 340,257, filed March 4, 1953.

Figure 1:
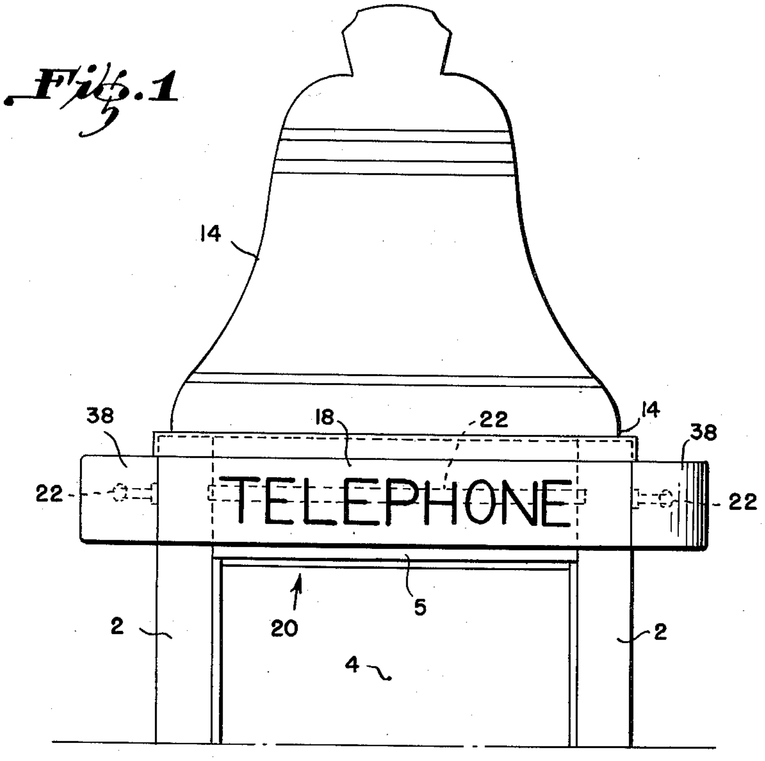
FIGURE 1 is an elevation of the top portion of a telephone booth incorporating the present invention.

The top covering for the booth may be in the form of a bell, as shown at 14 in FIGURE 1, or in the form of a curved dome, as shown at 16 in FIGURE 4. The bell and the dome of FIGURES 1 and 4 are preferably formed of a translucent or partially transparent material so that illumination emanating from the lamp 12, shown in FIGURE 4, or lamp 76, shown in FIGURE 3 contained within the booth and passing upwardly into the bell or dome will serve to illuminate the bell or dome making it visible from the exterior of the booth at night time. One possible arrangement for controlling the illuminating means is set forth in my copending patent application Serial No. 395,447, filed December 1, 1953.

Figure 2:
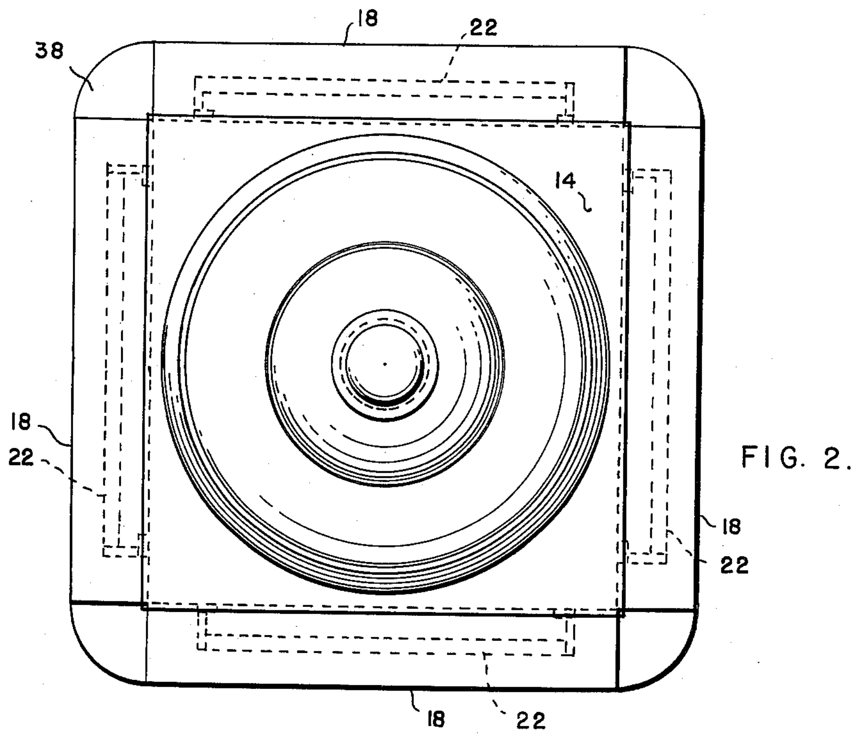
FIGURE 2 is a top view of the booth shown in FIGURE 1.

Adjacent to the upper portions of each side of the booth and extending transversely thereof is an indicia bearing panel 18 which is spaced outwardly from the side of the booth. The indicia bearing panel is preferably formed of transparent or translucent material, or of partially transparent or translucent material, and the indicia is preferably the word "Telephone," as indicated generally at 20 in FIGURE 1, which serves to clearly identify the booth. Illuminating means for the panel is provided in the form of a lighting tube 22 mounted behind the indicia bearing panel. While FIGURE 2 shows illuminated indicia bearing panels and illuminating means therefor mounted on each of the four sides of the booth, it will be evident that, if desired, illuminated indicia bearing panels may be provided on less than four sides of the booth. For example, if the booth is positioned in a corner, the booth need be provided with only two indicia bearing panels.

When more than one illuminated indicia bearing panel is employed, the corner formed at the booth between the two panels may be closed by a curved closure plate 38. The illuminating lamps 22 may be provided with power in any conventional manner or may be provided with power by a control arrangement such as that described in my last mentioned copending patent application.

Figure 3:
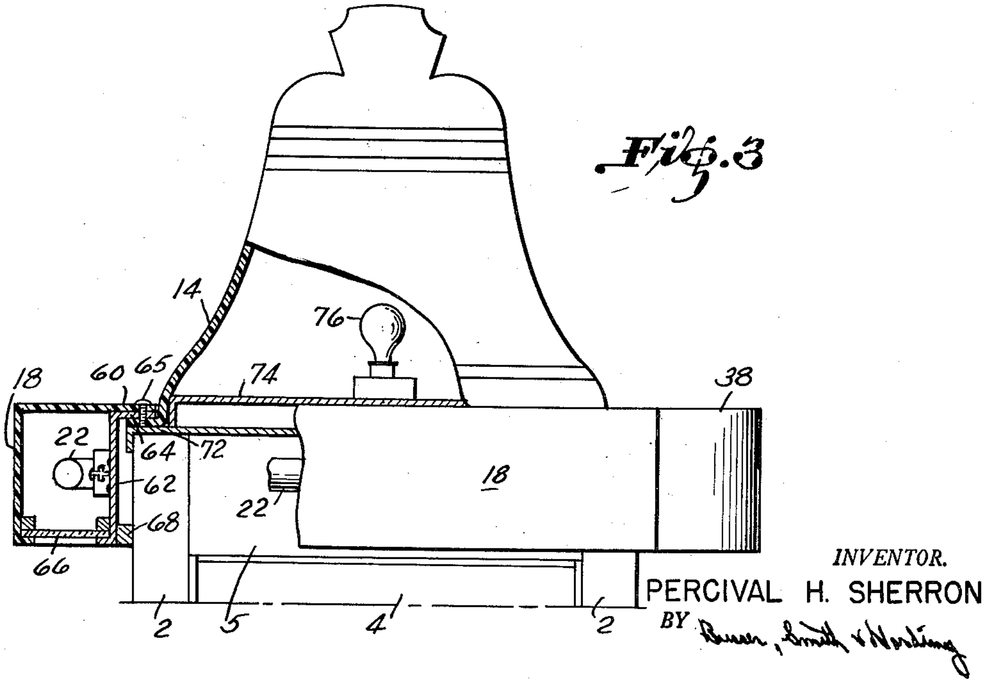
FIGURE 3 is a partially cut-away elevation of the telephone booth shown in FIGURE 1.

In FIGURE 3 the indicia bearing panels 12″ are each in the form of a downwardly extending leg of an angle having a horizontal inwardly extending leg 60. A second angle having a downwardly extending leg 62 mounts the illuminating means 22 and has a horizontal inwardly extending leg 64 which is adapted to lie under and be attached to the leg 60 of the angle previously described. The inwardly turned legs 60 and 64 are adapted to rest upon the top of a telephone booth. It will be evident that four indicia panel mounting assemblies, each consisting of a pair of angles such as the angles described, may have the ends of adjacent pairs of angles joined together by curved corner closure plates, such as the plates 38, to form a complete assembly. Such a complete assembly may be hung from the top of a conventional telephone booth. By virtue of the relatively long inwardly extending legs 60 and 64, a single standard assembly may be fitted over booths having a variety of exterior dimensions. A spacer block or strip 68 of suitable thickness for each particular installation may be positioned between the lower end of the lower inner leg 64 and the adjacent lintel 5 in order to hold the lower portion of the indicia panel mounting structure in the desired position.

The bell 14 is provided at its lower periphery with an outwardly extending flange 72 adapted to be engaged under the inwardly extending leg 64 of the indicia panel mounting assembly. It will be evident that the bell may be placed on top of any existing telephone booth and the indicia panel mounting assembly positioned thereover to hold the bell in position on the booth. A suitable mounting plate 74 may be positioned within the bell 70 and mounts an illuminating lamp 76 serving to illuminate the bell 14 which is preferably formed of a translucent material.

The bell 14 is provided with an outwardly extending lower flange 72 which is positioned between the flanges 60 and 64 of the indicia panel mounting assembly and the top of the telephone booth. These three flanges may be joined together by suitable fastening means such as a screw or pin 65. It will be noted, however, that the pin 65 may be omitted. If the flanges 60 and 64 have been preassembled, the entire indicia panel mounting assembly unit may be lowered over the top of the booth after the bell is positioned thereon. It will be evident that the assembly will hold the bell in position on the top of the booth without the necessity of providing fastening means such as the pin 65.

From the foregoing, it will be evident that the arrangement shown in FIGURE 3 includes an indicia panel mounting assembly and illuminated means adapted to extend upwardly from above the booth which may be installed on any existing booth with a minimum of adjustment or adaptation.

Various modifications may be made to the invention disclosed herein without departing from the scope of the invention as set forth in the following claims.

What is claimed is:

1. In apparatus for lighting up the outside of and identifying an outdoor telephone booth having a roof supported upon four upright wall panels, the combination comprising a horizontally extending enclosure including a sheet material inner wall member of generally inverted L shape in transverse section, an indicia bearing translucent sheet material outer wall member of generally inverted L shape in transverse section, the upright wall areas of said members being disposed in horizontally spaced relation to one another, the other wall areas of said members being turned in the same direction with that of the outer wall member extending across and closing the top of the enclosure and overlying that of the inner wall member, whereby the mutually overlying parts of said wall members conjointly form an external flange extending longitudinally of said enclosure and adapted for being seated upon the outer peripheral area of the telephone booth roof thereby to suspend said enclosure from the latter and position the same in overhanging relation thereto, and a movable access panel fitted between the upright wall areas of said members and extending across the bottom of said enclosure to close the same, and a lamp mounted upon the upright area of said inner wall member for illuminating said upright area of the outer wall member and thereby sharply delineating the indicia borne thereby.

2. The combination defined in claim 1 wherein the inner wall member is a one-piece sheet metal member, and the access panel is capable of transmitting light from the lamp for illumination of the ground area underlying said enclosure.

3. The combination defined in claim 1 wherein the enclosure is provided with a plurality of branches disposed in series relation to one another, thereby being adapted to extend around a corner of the telephone booth, and the external flange of said enclosure extends unbrokenly the full length of each enclosure branch.

4. In an outdoor telephone booth, means for lighting up and identifying the same comprising vertically extending booth side walls having horizontally extending narrow edges at the upper terminals thereof, a top member in the form of an indicia bearing dome covering the top of said booth and having a planar horizontally extending peripheral flange seated upon said narrow booth side wall edges, an elongated indicia bearing enclosure embracing the top of said booth and having extending horizontally inwardly therefrom a flange overlying said flange of the dome, said booth side walls and said enclosure being conjointly operative to secure said dome against being lifted from the top of said booth or shifted horizontally relative thereto, and means within said dome and enclosure for illuminating the same, thereby to prominently display the indicia borne thereby.

5. Means for lighting up and identifying an outdoor telephone booth as defined in claim 4 wherein the enclosure embracing the telephone booth is suspended by the flange of the enclosure from the tops of the booth side walls and thereby positioned in overhanging relation to the latter.

References Cited in the file of this patent

UNITED STATES PATENTS

| | | |
|---|---|---|
| 1,485,472 | Van Bloem | Mar. 4, 1924 |
| 1,592,966 | Yates | July 20, 1926 |
| 1,604,261 | Conover | Oct. 26, 1926 |
| 1,879,284 | Johnson et al. | Sept. 27, 1932 |
| 2,143,731 | Gallas | Jan. 10, 1939 |
| 2,239,343 | Rumbaugh | Apr. 22, 1941 |
| 2,543,008 | French | Feb. 27, 1951 |